3,032,053
GAS PROPORTIONER

John W. Ross, Toronto, Ontario, and Ronald L. W. Holmes and James Wilson, Downsview, Ontario, Canada, assignors to Union Carbide Canada Limited, Toronto, Ontario, Canada
Filed Apr. 10, 1961, Ser. No. 101,804
4 Claims. (Cl. 137—111)

This invention relates to a gas ratio control system and more particularly to such a system adapted to accurately proportion at least two gases in a desired ratio.

Many industrial operations require high purity accurately mixed gases. One major industrial application is in the lamp industry where a mixed gas—e.g. 88% argon and 12% nitrogen is required in incandescent lamp manufacture.

Up until the present time, these mixtures have had to be made up in gaseous form in special high pressure cylinder manifolds by trial and error pressure equalization. These cylinder manifolds were individually tested with a mass spectrometer and then the cylinders were delivered, sometimes great distances, to the point of use. Mixing, testing, and handling in this manner resulted in much higher cost. There did not exist up until the present time an apparatus for on-site mixing of low cost high purity bulk gas supplied with sufficient accuracy and reliability for critical gas mixing such as required in lamp filling. Of course, a bulk gas supply delivered in liquid form to the manufacturer and mixed on-site results in substantially lower costs and a mixed gas supply of higher purity.

Accordingly, it is a primary object of the invention to provide a novel gas ratio system wherein at least two gases may be intimately mixed in any desired ratio with an accuracy of at least ±1/10%.

Other objects are: To provide a gas ratio control system which continuously monitors and records the mixture analysis; To provide such a gas ratio control system with automatic shut-off means if the delivery mixture ratio exceeds or falls below pre-set tolerances; To provide such a system with control means to shut-off delivery of each gas if the gas supply pressure falls below pre-set limits; To provide a gas ratio control system capable of maintaining purity of the liquid gas as supplied to the system.

Other objects and advantages will be pointed out or become apparent from the following description and drawings in which.

The objects of the invention are accomplished in a general way by providing a gas ratio control system in combination with a control system for continuously monitoring the ratio of two different gases in a gas mixture which is being supplied to a point of use. This control system includes in one embodiment a gas analyzer which continuously analyzes the gas ratio. The analyzer is responsive to any change exceeding pre-set tolerances on the gas ratio and is connected in an electrical circuit which includes a relay. Such relay is activated by the analyzer when the ratio of the mixture exceeds the pre-set limits. The contacts of the relay operate: to close off a solenoid valve interposed in a mixed gas delivery line leading from a gas receiving vessel, thereby shutting off mixed gas flow to the point of use. The contacts of the relay also operate to close solenoid valves interposed in first and second gas supply lines communicating with the gas receiving vessel. The control system also is provided with a system for shutting off the flow of mixed gas from the receiving vessel when the gas supply pressure in the first and/or second gas supply lines falls below a pre-set limit. In this system a pressure sensing switch located in each supply line activates the relay when the supply pressure drops below the pre-set limit. The relay operates to close the same solenoid mentioned above in the mixed gas delivery line and to close the above mentioned solenoid valves interposed in the first and second supply line.

Figure 1:
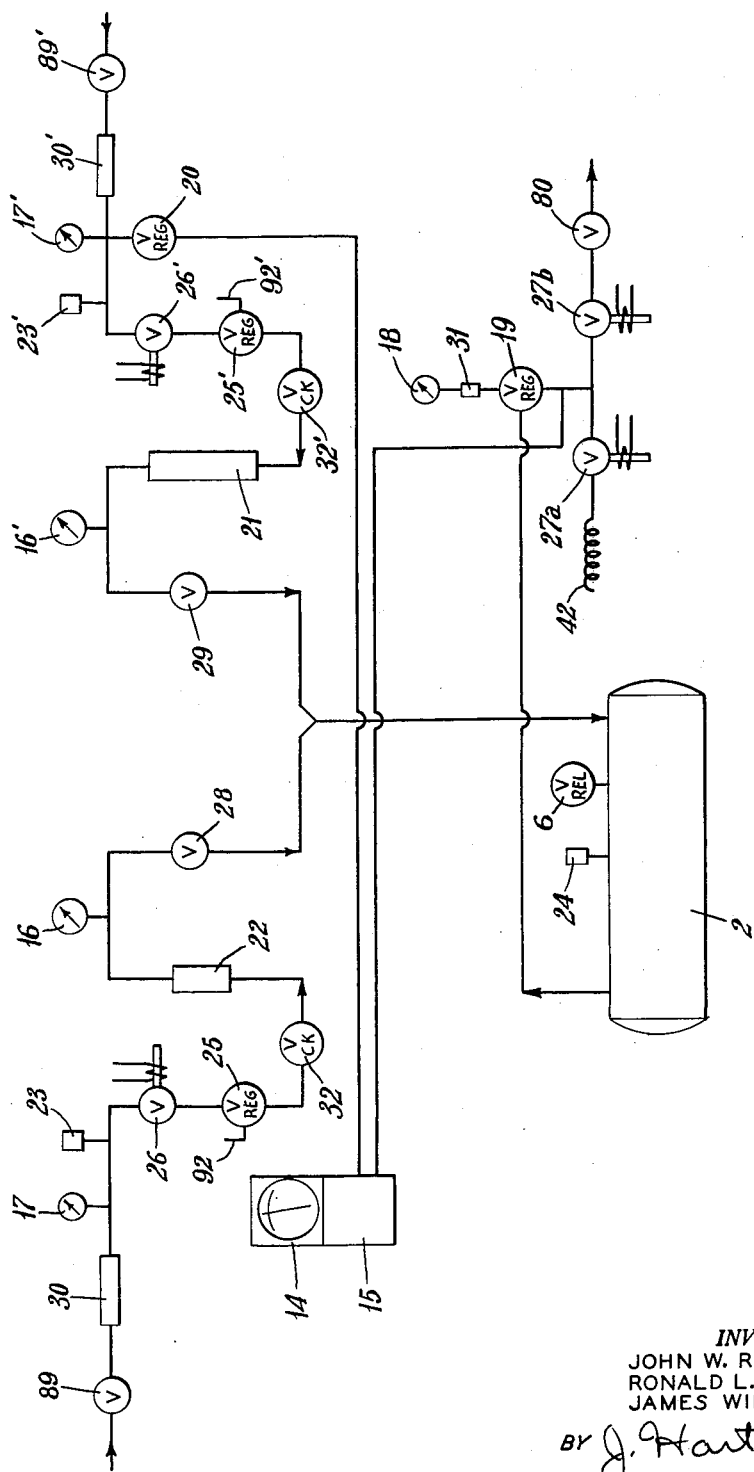
FIGURE 1 is a schematic drawing of the preferred gas ratio control system of the invention.

The invention will now be described in more detail in referring to the preferred embodiment shown in FIGURE 1. For purposes of simplicity of description, the discussion will be confined to two gases only, namely argon and nitrogen. However, the concept of the invention can, with appropriate modifications, be adapted to a system for mixing more than two gases. Also gases other than argon and nitrogen can be mixed for example other gases could be hydrogen, carbon dioxide, oxygen, helium, etc.

Argon and nitrogen gas from the bulk supplies are fed into the gas ratio control unit through valves 89, 89' and filters 30, 30' at some pressure in the region of 150–250 p.s.i. The supply pressures are indicated on pressure gauges 17, 17'.

Pressure regulators 25, 25' reduce the supply pressure to the metering pressure (115 p.s.i.) indicated by pressure gauges 16, 16'. The two gases pass through flowmeters 22 and 21 and then flow into a gas receiving vessel such as a tank 2 through a common line. The correct individual gas flows for the particular ratio required are set on the flowmeters 22 and 21 by means of valves 28 and 29.

From the tank 2, the mixed gas passes through regulator 19 to the point of use, in this case a lamp filling machine, via solenoid valve 27b and valve 80. Pressure snubber 31 prevents damage to gauge 18 from pressure surges occurring when solenoid valves 27a and 27b suddenly close.

The tank 2 is always filled with mixed gas and operates between fixed pressure limits of 40 p.s.i. and 50 p.s.i. When the tank pressure falls to the low limit (40 p.s.i.) due to removal of mixed gas, pressure switch 24 operates and causes solenoid valves 26, 26' to open. The filling cycle then commences and the tank pressure builds up to the high limit (50 p.s.i.).

When the high pressure limit (50 p.s.i.) is attained in tank 2, pressure switch 24 again operates to close solenoid valves 26, 26' completing the tank filling cycle.

The flow rates are set such that the tank filling cycle takes only a few seconds, whereas the emptying cycle may take several minutes, dependent on the rate at which the mixed gas is being removed from the tank to the lamp machine.

Pressure relief valve 6 ensures that the tank's maximum working pressure (100 p.s.i.) is not exceeded. Check valves 32, 32' prevent back leakage of mixed gas from the tank 2 to the regulators 25, 25'. These valves are necessary due to the type of pilot operated regulators 25, 25' used in this unit. Other types of regulators could be used which would not require check valves 32, 32' to be used.

A sample of the mixed gas is continuously taken from the delivery side of regulator 19 to the analyzer 15. Also, a small flow of argon is continuously taken from the delivery side of regulator 20 to the analyzer 15. This is necessary since the analyzer operates on the gas thermal conductivity principle and requires a constant flow of reference gas (in this case, argon). Other analyzers, such as an electric discharge type could be used.

The percentage of nitrogen in the argon/nitrogen mixture is monitored continuously by the analyzer 15, and noted on recorder 14.

Limit switches in recorder 14 are set to provide a plus and minus tolerance over the nominal value of the required gas mixture ratio (e.g. 12±0.5% nitrogen in an argon/nitrogen mixture). When these tolerances are exceeded due to some malfunction, the limit switches operate closing solenoid valves 26, 26' and 27b thereby preventing off-analysis gas from entering the lamp filling machine and at the same time preventing further filling of the tank 2.

A manually operated venting arrangement is provided which includes manual switch 36, solenoid valves 26 and 26', and venting solenoid valve 27a. When the system is to be vented, switch 36 is closed opening valves 26' and 26 and 27a. Thus, off-analysis gas passes through the system and is vented to atmosphere through valve 27a thereby purging tank 2 and piping. Manual switch 36 remains closed until the trouble is corrected and until on-analysis gas is vented to the atmosphere as described hereinafter.

When the malfunction has been corrected and on-analysis gas is again flowing in the system, the recorder 14, limit switches operate to open solenoid valves 26, 26' and 27b and again pass mixed gas to the lamp filling machine.

In the event of supply pressure failure in one or both supplies, pressure switches 23 and 23' operate to close solenoid valves 26, 26', and 27b. This shuts off the gas supply to the lamp filling machine as before.

Figure 2:
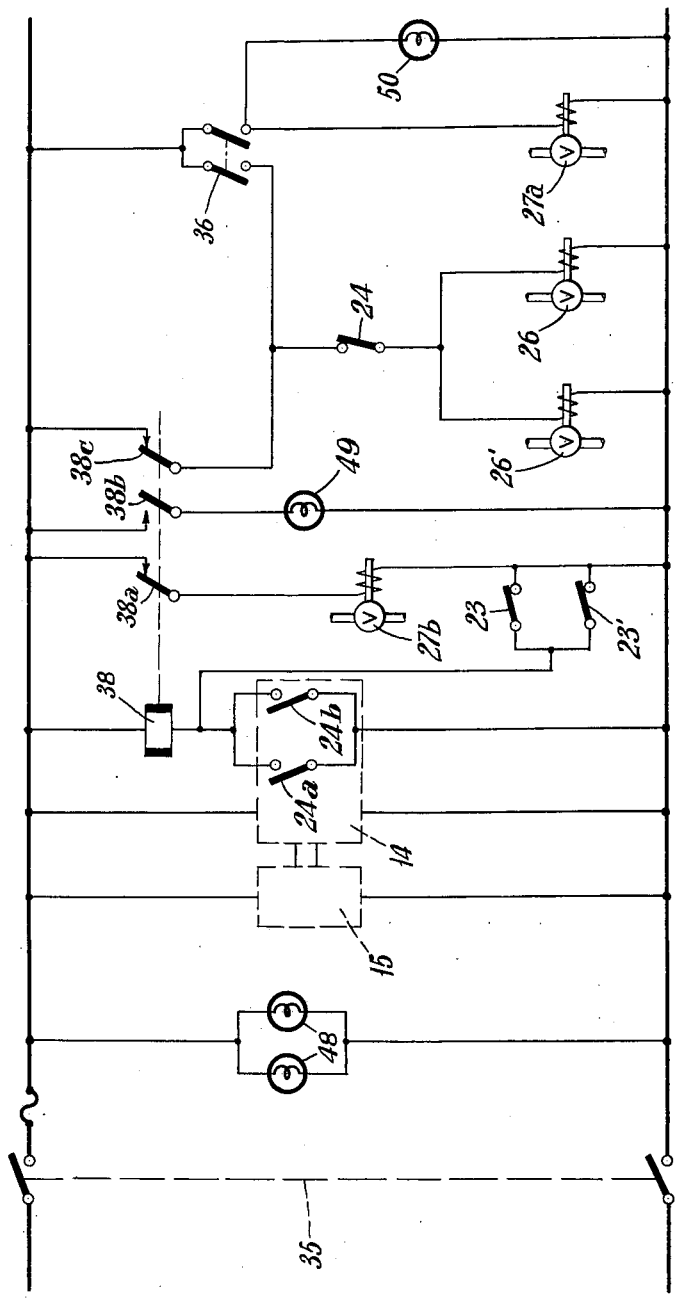
FIGURE 2 is a wiring diagram of the essential circuits of the invention.

The analyzer 15 and recorder 14 are connected as shown in FIGURE 2. The output signal from the analyzer is fed continuously into the recorder, the dial of which has a circular scale calibrated to show the percentage of nitrogen in the argon/nitrogen mixture which is indicated by a large pointer movable along the scale. A pen and chart mechanism of the recorder allows permanent records of the gas mixture produced to be kept.

The gas sample bleed to the analyzer is preferably taken at a point just before the mixture leaves the mixer unit, i.e. just downstream of regulator 19. This ensures that the recorder always monitors the analysis of the gas mixture just before the mixture passes into the lamp filling machine. Alternatively, however, the bleed could be taken off from tank 2 to monitor the gas mixture therein.

The response of the analyzer is such that only a negligible amount of off-analysis mixed gas could pass through the outlet solenoid valve 27b, before the recorder limit switches would operate to shut this valve.

Referring to FIG. 2, the elements which make up the automatic control arrangement which shuts off the mixer in the event of the pre-set mixture tolerances being exceeded are the analyzer 15, recorder 14, relay 38, outlet solenoid valve 27b, argon solenoid valve 26', nitrogen solenoid valve 26 and red pilot light 49.

The gas mixture tolerances are pre-set on the recorder 14 limit switches 24a and 24b. There are two normally open limit switches, one for the high limit and one for the low limit of the tolerances.

When an off-analysis gas mixture flows into the analyzer, the signal to the recorder is increased or decreased (depending on which way the mixture is off-analysis). If the tolerance is exceeded, one of the recorder limit switches 14a or 14b closes energizing the coil of relay 38, closing contacts 38b and opening contacts 38a and 38c.

This:

(a) De-energizes the outlet solenoid valve 27b shutting off mixed gas flow from the mixer to the lamp machine.
(b) Prevents or stops the tank from filling by de-energizing both the argon and nitrogen solenoid valves 26 and 26'.
(c) Energizes the red pilot light 49 to give visual indication that the mixer has shut off.

To purge the tank 2 and system clear of off-analysis gas mixture, while the cause of the malfunction is being rectified, the manual venting switch 36 is closed.

This:

(a) Energizes the venting solenoid valve 27a allowing the off-analysis gas in the system to escape to atmosphere.
(b) Energizes the argon and nitrogen solenoid valves 26, 26' allowing fresh gas to flow into the tank 2.
(c) Energizes the yellow pilot light 50 to give visual indication that the vent valve 27a is open.

When the necessary corrective action has been taken to bring the gas mixture back within the tolerances (e.g. by adjusting flowmeter 21 and 22 settings) the analyzer 15 output signal will allow the recorder pointer to return to the pre-set operating range. The recorder limit switch then opens, de-energizing the coil of relay 38. Manual switch 36 remains closed.

This:

(a) Energizes the outlet solenoid valve 27b allowing on-analysis mixed gas to flow from the mixer to the lamp machine.
(b) Extinguishes the red pilot light 49 to give visual indication that the mixer is again "on-analysis."

The manual switch 36 is now opened.

This:

(a) De-energizes the venting solenoid 27a shutting off the escape of on-analysis mixed gas to the atmosphere.
(b) Extinguishes the yellow light 50 to give visual indication that venting valve 27a is closed.

The mixer now continues to operate normally delivering on-analysis mixed gas to the lamp machine.

The elements which make up the automatic control arrangement which shuts off the mixer in the event of gas supply pressures falling below pre-set limits are argon and nitrogen pressure switches 23, 23', relay 38, outlet solenoid valve 27b, argon solenoid valve 26', nitrogen solenoid valve 26 and red pilot light 49.

The minimum allowable supply pressure is set on the argon and nitrogen pressure switches 23, 23'.

When the supply pressure is in excess of the minimum value (i.e. normal operation) the normally closed contacts of the two pressure switches 23, 23' are open preventing the coil of relay 38 from being energized through the pressure switch circuit.

When either the argon or the nitrogen supply falls below the pre-set value, the appropriate pressure switch 23 or 23' (argon or nitrogen) contacts close and energize the coil of relay 38.

This shuts down the mixer unit as before.

The purity of the bulk gas supply is maintained by the use of good quality joints all through the system piping. These joints are preferably either metal to metal fittings or Teflon taped pipe thread joints.

Flowmeters 21 and 22 have Teflon gaskets and O-ring seals rather than the standard rubber or asbestos seals.

Regulators 19 and 25 have special Teflon backed rubber diaphragms rather than the standard rubber diaphragm.

The use of Teflon on the pipe thread joints for O-ring seals and for regulator diaphragm backing is based on the fact that Teflon has a much lower permeability to moisture than rubber compounds. Hence, the pick-up of moisture from the atmosphere by the argon and nitrogen gas and the mixed gas is reduced by the use of Teflon in place of rubber, where possible.

A further attempt to prevent ingress of moisture to the system is made by use of back diffusion coil 42.

This coil of tubing is of such length that back diffusion of moisture into the mixer piping is prevented during venting of the system.

Similar back diffusion tubes 92 and 92' are utilized on the pilot bleeds from the regulators 25 and 25'. However, if a non-pilot-operated type of regulator is used here, with no bleed to atmosphere, then back diffusion tubes are not necessary.

Packless type argon and nitrogen inlet valves 89 and 89' and mixed gas outlet valve 80 are also used to reduce the possibility of contamination of the supply and mixed gases.

It will be obvious that modifications in the details, arrangements, and number of parts may be made without departing from the spirit and scope of the present invention.

For example, a very large storage tank could be connected downstream of solenoid valve 27b for receiving on-analysis gas. Then, gas from such tank could be supplied to several lamp filling machines.

What is claimed is:

1. In a gas ratio control system the combination with a first gas supply line having an inlet end connected to a source of a first gas and a second gas supply line connected to a source of a second gas each of said gas lines having interposed therein an adjustable pressure regulator, a flow indicating device, flowmetering means, and an electrically operated valve; a gas receiving vessel communicating with the outlet of said first and second gas lines for receiving said first and second gases; a mixed gas delivery line communicating with said gas receiving vessel for passing a mixed gas flow to the point of use; and a pressure regulating means interposed in said mixed gas delivery line; of a control system including a system for continuously monitoring the ratio of said gases in said gas mixture comprising a gas analyzing means connected in said gas ratio control system, means associated with said analyzing means and being responsive to a change exceeding pre-set tolerances on said gas ratio, a relay means activated by said means associated with said analyzer when said pre-set tolerances are exceeded, electrically operated valve means connected in said mixed gas delivery line and operated by said relay means to shut off the mixed gas flow from said gas receiving vessel to the point of use, said relay means also operating to close said electrically operated valves in said first and second gas supply lines; said control system also including a system for shutting off the flow of gas from said gas receiving vessel when the gas supply pressures in said first and second supply lines fall below pre-set limits comprising pressure sensing means connected into each of said first and second gas supply lines, said pressure sensing means operating to energize said relay means when the pressure in at least one of said gas supply lines falls below said preset limit, and said relay means operating to close said electrically operated valve means connected in said mixed gas delivery lines to shut off the mixed gas flow from said gas storing and mixing vessel and to close said electrically operated valves in said first and second gas supply lines.

2. A system according to claim 1 wherein said relay means upon activation operates to close a circuit containing an alarm device.

3. Apparatus according to claim 1 and including a purge system which comprises a circuit including means for making and breaking said circuit, said electrically operated valves in said first and second gas supply lines and an electrically operated valve having its inlet side communicating with said mixed gas delivery line and its outlet side vented to the atmosphere whereby upon making of the circuit the last named solenoid valve opens to purge the gas ratio control system of any gas contained therein and the electrically operated valves in the first and second gas supply lines open to supply fresh gas to the gas storing and mixing vessel.

4. In a gas ratio control system the combination with a first gas supply line having an inlet end connected to a source of a first gas and a second gas supply connected to a source of a second gas each of said gas lines having interposed therein an adjustable pressure regulator, a flow indicating device, throttling means, and an electrically operated valve; a gas storing and mixing vessel communicating with the outlet of said first and second gas lines for receiving and mixing said first and second gases; a mixed gas delivery line communicating with said gas storing means for passing a mixed gas flow to the point of use; and a pressure regulating means interposed in said mixed gas delivery line; of a control system including a system for continuously monitoring the ratio of said gases in said gas mixture comprising analyzing means having one inlet connected to the delivery side of said pressure regulator means interposed in said mixed gas delivery line and another inlet connected to one of said gas supply lines; means associated with said analyzing means and being responsive to a change exceeding pre-set tolerances on said gas ratio, a relay activated by said last named means associated with said analyzer when said pre-set tolerances are exceeded, electrically operated valve means connected in said mixed gas delivery line and operated by said relay to shut off the mixed gas flow from said gas storing and mixing vessel to the point of use, said relay also operating to close said electrically operated valves in said first and second gas supply lines; said control system also including a system for shutting off the flow of gas from said storing and mixing vessel when the gas supply pressures in said first and second supply lines fall below pre-set limits comprising pressure sensing means connected into each of said first and second gas supply lines, said pressure sensing means operating to energize said relay when the pressure in at least one of said gas supply lines falls below said pre-set limit, and said relay operating to close said electrically operated valve means connected in said mixed gas delivery line to shut off the mixed gas flow from said gas storing and mixing vessel and to close said electrically operated valves in said first and second gas supply lines.

References Cited in the file of this patent
UNITED STATES PATENTS

| | | |
|---|---|---|
| 1,830,333 | Parker | Nov. 3, 1931 |
| 2,072,384 | Schmidt | Mar. 2, 1937 |
| 2,643,944 | Malir | June 30, 1953 |